United States Patent
Kose et al.

(10) Patent No.: US 9,543,994 B1
(45) Date of Patent: Jan. 10, 2017

(54) METHODS AND SYSTEMS FOR ESTIMATION AND MITIGATION OF SWEPT-TONE INTERFERERS

(71) Applicant: TrellisWare Technologies, Inc., San Diego, CA (US)

(72) Inventors: Cenk Kose, San Diego, CA (US); Keith M. Chugg, La Cañada, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 0 days.

(21) Appl. No.: 15/053,966

(22) Filed: Feb. 25, 2016

(51) Int. Cl.
*H04B 1/7097* (2011.01)
*H04B 1/10* (2006.01)

(52) U.S. Cl.
CPC ...................... *H04B 1/10* (2013.01)

(58) Field of Classification Search
CPC ............... H04B 1/7097–1/712; H04B 2201/7097–2201/70979; H04B 1/10
See application file for complete search history.

(56) References Cited

U.S. PATENT DOCUMENTS

| | | | |
|---|---|---|---|
| 6,434,233 B1 | 8/2002 | Bjarnason et al. | |
| 2010/0158075 A1* | 6/2010 | Deisher ............... | H04B 1/7097 375/130 |
| 2012/0243630 A1* | 9/2012 | Golovins ............. | H04B 17/005 375/260 |
| 2016/0156424 A1* | 6/2016 | Mirbagheri ........... | G01S 1/20 375/227 |
| 2016/0192362 A1* | 6/2016 | Galeev ................ | H04L 5/0026 370/335 |

OTHER PUBLICATIONS

Borio et al., "Tracking and Mitigating a Jamming Signal with an Adaptive Notch Filter," Inside GNSS, Mar./Apr. 2014, pp. 67-73.
Djuric et al., "Parameter Estimation of Chirp Signals," IEEE Transactions on Acoustics, Speech, and Signal Processing, Dec. 1990, vol. 38, No. 12, pp. 2118-2126.

* cited by examiner

*Primary Examiner* — Dac Ha
(74) *Attorney, Agent, or Firm* — Kilpatrick Townsend & Stockton LLP

(57) ABSTRACT

The estimation and mitigation of swept-tone interferers includes receiving a composite signal comprising a signal of interest and a swept-tone interferer over an observation bandwidth. The estimation of the interfering signal may be based on modeling the interferer over the observation bandwidth as a magnitude periodic signal comprising non-overlapping, contiguous epochs, where each epoch may comprise a common pulse shape and a distinct phase rotation. The period of the magnitude-periodic signal may be initially determined, and the common pulse shape and each of the distinct phase rotations may then be estimated. These estimates may be used to reconstruct an estimate of the swept-tone interferer, which may be subtracted from the composite signal to generate an interference-mitigated signal of interest.

20 Claims, 7 Drawing Sheets

METHODS AND SYSTEMS FOR ESTIMATION AND MITIGATION OF SWEPT-TONE INTERFERERS

FIELD OF THE INVENTION

The present invention relates to wireless communication systems that are subject to interference, and in particular, the estimation and mitigation of swept-tone interferers that are routinely employed as jamming signals.

BACKGROUND

Swept-tone interferers are usually characterized by linear frequency modulations: the instantaneous frequency of the signal sweeps a range of several megahertz (MHz) in a few microseconds, thereby affecting the entire band targeted by the interfering signal. A narrowband system that is subjected to this broadband swept-tone interferer may experience degraded system performance. Furthermore, the fast variations of the instantaneous frequency of swept-tone jammers make the design of mitigation techniques particularly challenging.

In an effort to mitigate swept-tone interferers, previous approaches developed include adaptive notch filters that can track the instantaneous frequency of the swept tone (see, for example, "Tracking and Mitigating a Jamming Sign al with an Adaptive Notch Filter," Daniele Borio et al., Inside GNSS, March/April 2014), joint estimation of the parameters of a chirp signal using a least-squares approach (see, for example, "Parameter Estimation of Chirp Signals," Petar M. Djurić and Steven M. Kay, IEEE Transactions on Acoustics, Speech, and Signal Processing, Vol. 38, No. 12, pp. 2118-2126, December 1990), and tone prediction using an adaptive filter structure to enable cancellation of periodic interference signals (see, for example, the disclosure in U.S. Pat. No. 6,434,233 B1).

SUMMARY

In comparison to these previously developed approaches, some of which directly estimate the parameters of the interfering signal, some embodiments of the present invention estimate the period of the swept-tone interferer and models it, in the observation bandwidth, as a magnitude-periodic signal with a common pulse shape. Each periodic segment of the interfering signal may be different from any other segment in phase. The interference estimate may be subtracted from the received filtered composite signal to generate an interference-mitigated signal of interest.

Embodiments of the present invention are directed towards methods and systems for the estimation and mitigation of swept-tone interferers. For example, in one embodiment, a method for estimating a swept-tone interferer comprises: receiving a composite signal over an observation bandwidth, wherein the composite signal comprises a signal of interest and the swept-tone interferer; modeling the swept-tone interferer over the observation bandwidth as a magnitude-periodic signal, wherein the magnitude-periodic signal comprises a plurality of phase-rotated pulses, and wherein each of the plurality of phase-rotated pulses comprises a common pulse shape and a distinct phase rotation; generating an energy signal based on the composite signal; estimating a period of the magnitude-periodic signal based on the energy signal; generating an initial estimate of the common pulse shape based on the period and energy detection of the composite signal, wherein a length of the initial estimate of the common pulse shape is equal to the period; generating a plurality of phase estimates based on a plurality of epochs and the initial estimate of the common pulse shape, wherein the plurality of epochs corresponds to non-overlapping, contiguous segments of the composite signal, wherein a length of each of the plurality of epochs is equal to the period, wherein each of the plurality of epochs comprises the common pulse shape, and wherein each of the plurality of phase estimates is generated for each of the plurality of epochs; generating a plurality of phase de-rotated pulse estimates, wherein each of the plurality of phase de-rotated pulse estimates is based on each of the plurality of epochs and each of the plurality of phase estimates; computing a weighted average of the plurality of phase de-rotated pulse estimates to generate a final estimate of the common pulse shape; and generating an estimate of the swept-tone interferer based on the final estimate of the common pulse shape and the plurality of phase estimates. In some embodiments, the method for mitigating the swept-tone interferer further comprises: subtracting the estimate of the swept-tone interferer from the composite signal to generate an interference-mitigated signal of interest.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

Figure 1A:
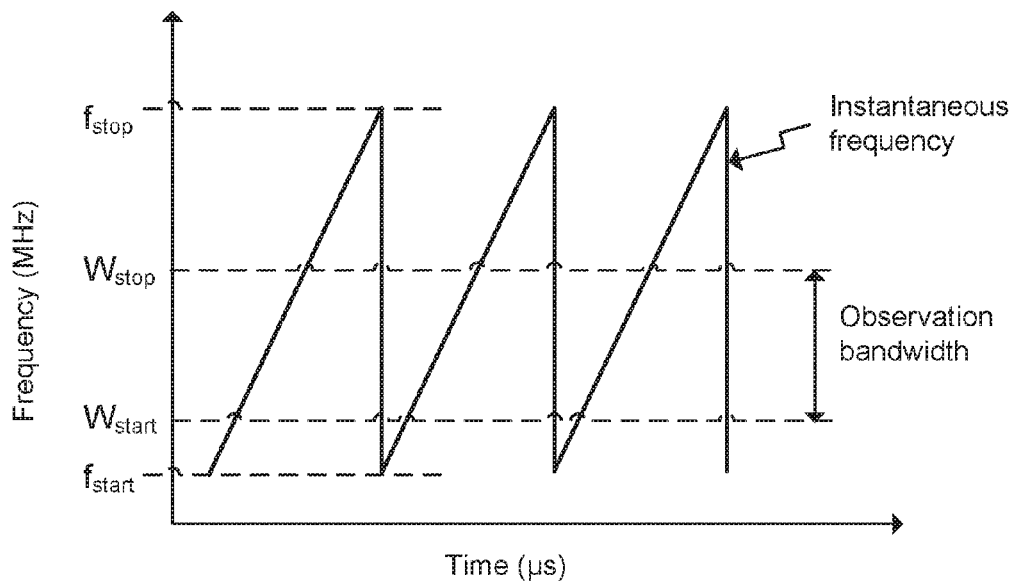
FIGS. 1(a) and 1(b) are plots of the instantaneous frequency of swept-tone interferers that can be estimated and mitigated by embodiments of the present invention.

Like labels are used to refer to the same or similar features in the drawings.

DETAILED DESCRIPTION

Figure 1B:
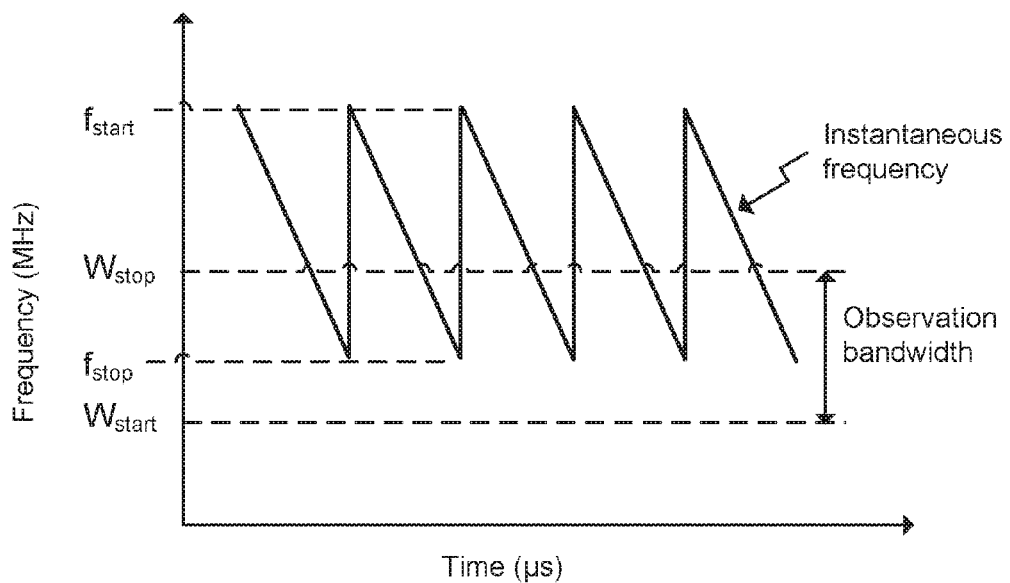

The present invention is well-suited for the estimation and mitigation of swept-tone interferers, i.e. jamming signals that are frequency-modulated with a fast varying center frequency. The time-frequency evolution, or instantaneous frequency as function of time, for representative swept-tone interferers are shown in FIGS. 1(a) and 1(b), wherein the interfering signal sweeps from a frequency $f_{start}$ to a frequency $f_{stop}$ over a few microseconds, and the system that is being affected by this interfering signal operates over an observation bandwidth, denoted $[W_{start}, W_{stop}]$. More generally, the swept-tone interferer may be modeled as $$J(t) = A \cdot \cos(2\pi \xi(t) t + \theta),  \quad \text{Eq (1)}$$

where $\xi(t)$ is the instantaneous frequency as a function of time, $t \in (0, T)$, $\theta$ is a random initial phase, and $1/T$ is the repetition frequency of the sweep. In an embodiment, the instantaneous frequency is a linear function, which may be specified as:

$$\xi(t) = \frac{f_{stop} - f_{start}}{T} t + f_{start}.  \quad \text{Eq (2)}$$

In another embodiment, the instantaneous frequency may be any function of time that adheres to the edge conditions defined below for each epoch, $k \in [0, K]$, in the received signal:

$$\xi(\theta) = f_{start};\ \xi(kT^-) = f_{stop};\ \text{and}\ \xi(kT^+) = f_{start}.  \quad \text{Eq (3)}$$

In the example in FIG. 1(a), the observation bandwidth lies entirely within the sweep-range of the interferer, whereas FIG. 1(b) illustrates the sweep-range of the interferer originating within the observation bandwidth and ending outside the observation bandwidth. In general, embodiments of the present invention are able to successfully estimate and mitigate a swept-tone interferer as long as its sweep-range crosses either edge of the observation bandwidth, which may be represented by the conditions $f_{start} < W_{start} < f_{stop}$ and $f_{start} < W_{stop} < f_{stop}$. That is, the observation bandwidth may lie entirely within the sweep-range, or the sweep-range may start or stop within the observation bandwidth.

Figure 2A:
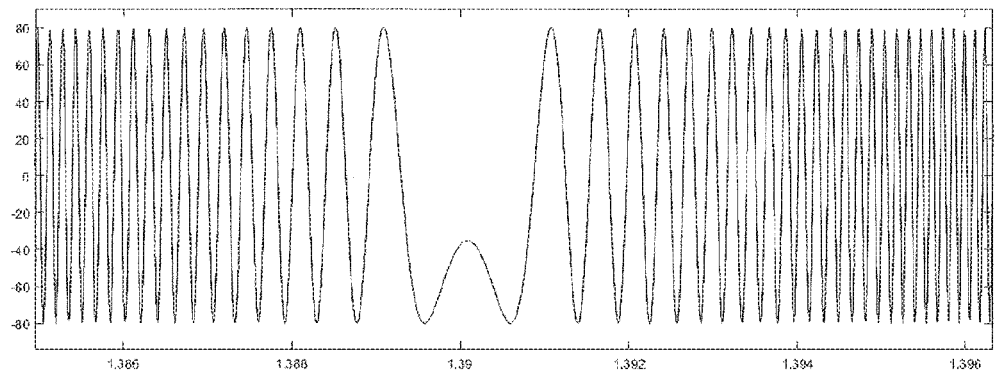
FIGS. 2(a), 2(b) and 2(c) are time-series plots of a swept-tone interferer at different stages in an embodiment of the present invention.
Figure 2B:
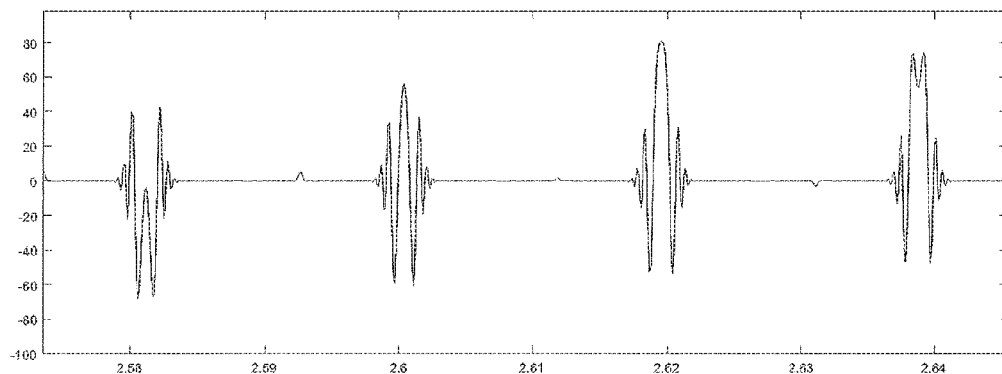
Figure 2C:
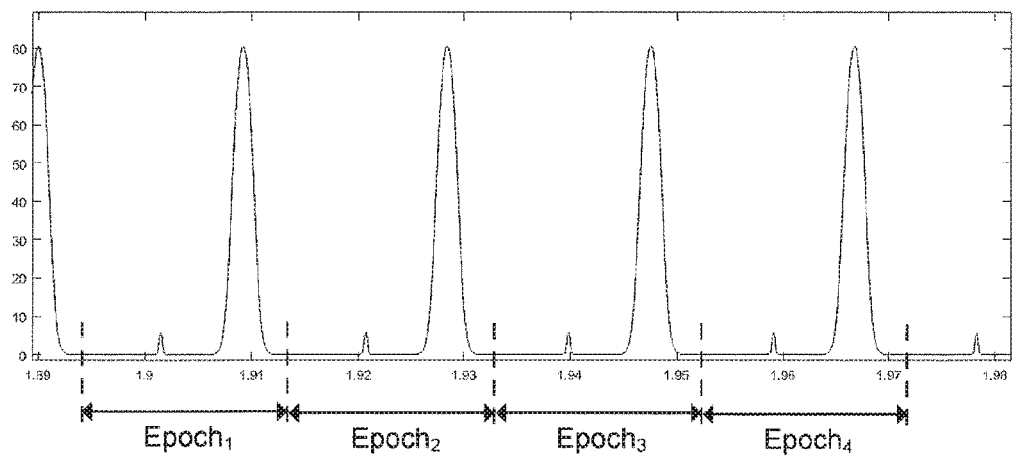

The waveforms shown in FIGS. 2(a)-2(c) are generated upon sampling the composite signal (comprising the signal of interest and the swept-tone interferer) over the observation bandwidth. In an embodiment, the power of the swept-tone interferer is significantly greater than that of the signal of interest. Specifically, FIG. 2(a) shows the real component of the complex-valued swept-tone interferer over the observation bandwidth. As expected, the instantaneous frequency decreases (approaching its lowest frequency at ~1.39) and then increases as a function of time, which is characteristic of a swept-tone interferer. FIG. 2(b) shows the real component of the swept-tone interferer after a low-pass filtering operation. In an embodiment, the low-pass filter has a bandwidth that is equal to or less than the observation bandwidth. The magnitude-square of the complex-valued filtered composite signal is shown in FIG. 2(c). The waveform shown in FIG. 2(c) is a periodic signal, termed a "magnitude-periodic signal," and serves as the basis of the model used for the estimation and mitigation of swept-tone interferers, as described in embodiments of the present invention. A period of the magnitude-periodic signal, as shown in FIG. 2(c), is called an epoch. Thus, the magnitude-periodic signal may be construed as comprising multiple non-overlapping, contiguous epochs.

Figure 3:
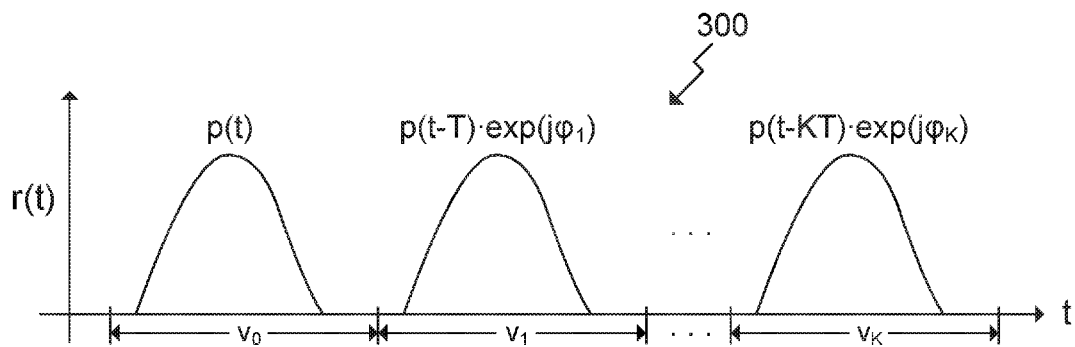
FIG. 3 is an embodiment of a magnitude-periodic signal that enables estimation and mitigation of a swept-tone interferer, according to some embodiments of the present invention.

FIG. 3 depicts another model of a magnitude-periodic signal that is used to enable the estimation of the swept-tone interferer. Herein, the epochs of the magnitude-periodic signal are denoted $v_0, v_1, \ldots, v_K$. In an embodiment, each epoch comprises a common pulse shape p(t) with a distinct phase rotation $\phi_i$, and can be expressed as $$v_k(t) = p(t) \exp(j\phi_k).  \quad \text{Eq (4)}$$

Consequently, the magnitude-periodic signal may be represented as $$r(t) = \sum_{k=0}^{K} v_k(t - kT) = \sum_{k=0}^{K} p(t - kT) \exp(j\varphi_k)  \quad \text{Eq (5)}$$

where T is the period of the magnitude-periodic signal and therefore also the length of each epoch. This signal representation is used to model the swept-tone interferer in the observation bandwidth. In another embodiment, each epoch may further comprise a distinct amplitude, i.e.

$$v_k(t) = A_k p(t) \exp(j\phi_k).  \quad \text{Eq (6)}$$

Figure 4:
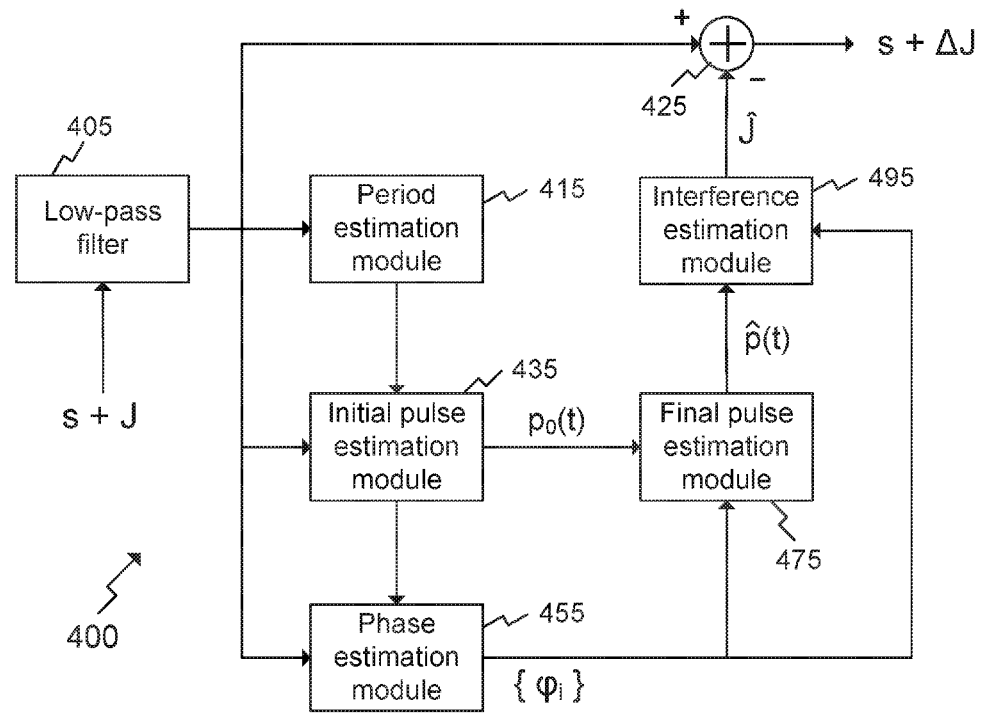
FIG. 4 is a block diagram of an embodiment for estimation and mitigation of a swept-tone interferer, according to an embodiment of the present invention.

FIG. 4 is a block diagram 400 of an embodiment for estimation and mitigation of a swept-tone interferer, according to the present invention. This system includes some features and/or components that are similar to those shown in FIGS. 2 and 3, and described above. At least some of these features and/or components may not be separately described in this section.

In an embodiment, a composite signal comprising a signal of interest s and a swept-tone interferer J is received and filtered using a low-pass filter 405. As described in FIG. 3, the low-pass filtered swept-tone interferer comprises non-overlapping, contiguous epochs, wherein each epoch comprises a common pulse shape p(t) and a distinct phase rotation $\phi_k$. The filtered composite signal is used by a period estimation module 415 to determine the period T of the swept-tone interferer, which is also the length of the epoch. The period T and the filtered composite signal are then utilized by an initial pulse estimation module 435 to generate an initial estimate $p_0(t)$ of the common pulse shape p(t).

A phase estimation module 455 uses the initial pulse estimate $p_0(t)$ in conjunction with the filtered composite signal to generate estimates for the set of distinct phase rotations $\{\phi_k\}_{k=1}^{K}$ for each of the epochs. The final pulse estimation module 475 generates a final estimate of the common pulse shape $\hat{p}(t)$ based on the initial pulse estimate and the set of distinct phase rotations. This final pulse estimate of the common pulse shape, and the set of distinct phase rotations, is used by an interference estimate module 495 to generate an estimate of the swept-tone interferer. Summer 425 is used to subtract the estimate of the swept-tone interferer from the filtered composite signal to generate an interference-mitigated signal of interest.

Figure 5A:
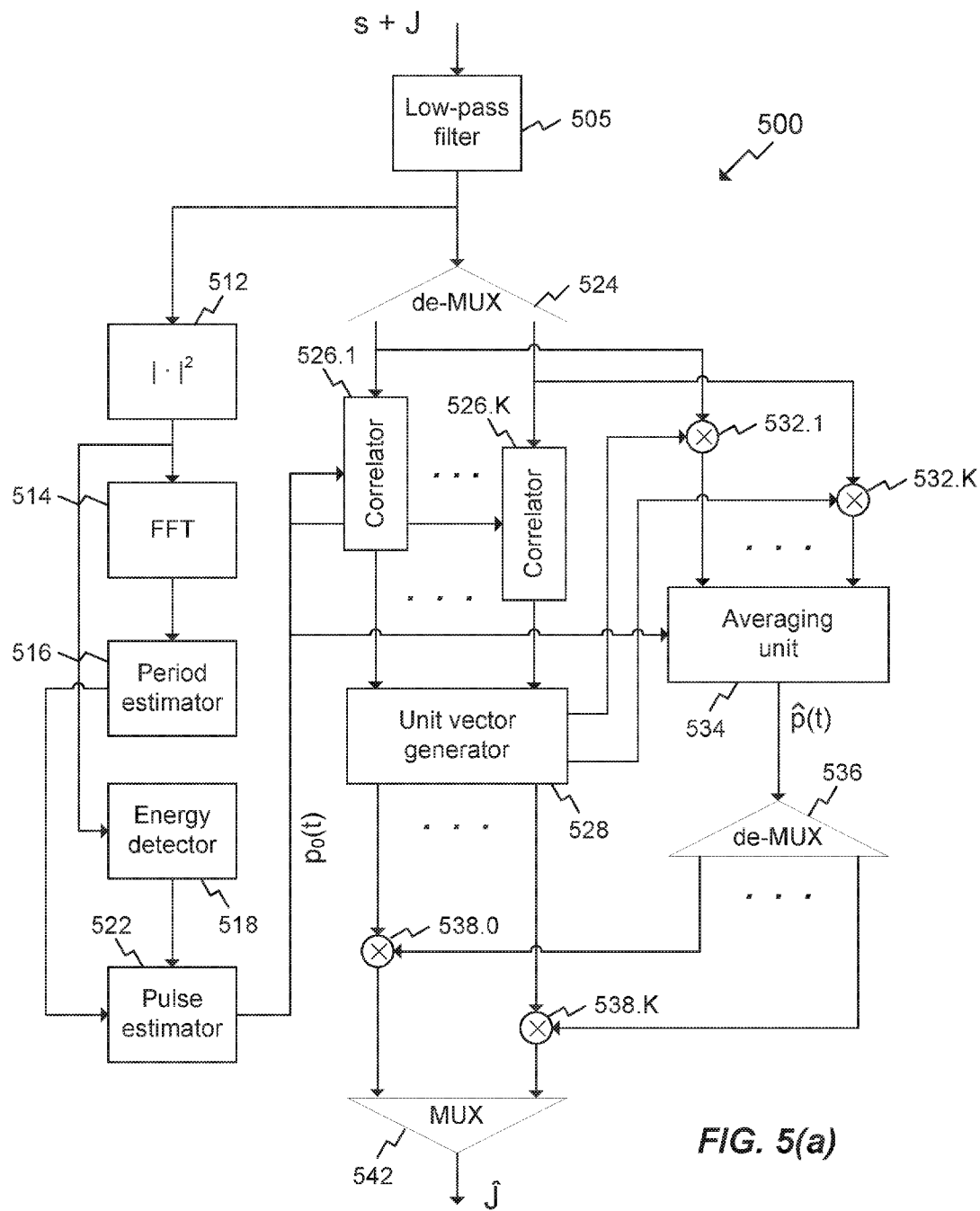
FIGS. 5(a) and 5(b) are block diagrams of another embodiment for estimation and mitigation of a swept-tone interferer, according to the present invention.

FIG. 5(a) is a block diagram 500 of an embodiment for estimation and mitigation of a swept-tone interferer, according to the present invention. This system includes some features and/or components that are similar to those shown in FIGS. 2, 3 and 4, and described above. At least some of these features and/or components may not be separately described in this section.

In an embodiment, the magnitude-square of the filtered composite signal (also referred to as an energy signal) is computed using a squaring module 512, and serves as an input to a fast Fourier transform (FFT) block 514 and an energy detector 518. The FFT block 514 computes a frequency spectrum of the energy signal, and the period estimator 516 uses at least one harmonic of the frequency spectrum to estimate the period T of the energy signal.

The initial estimate of the common pulse shape $p_0(t)$ is generated using a pulse generator 522, and is based on the period T and the output of the energy detector 518. In an embodiment, and in reference to FIG. 3, the initial estimate of the common pulse shape is the epoch $v_0$, i.e. $p_0(t)=v_0$. That is, the phase $\phi_0$ for the first epoch is assumed to be zero.

Demultiplexer 524 is used to partition the non-overlapping, contiguous epochs of the filtered composite signal into individual segments, denoted $v_1, v_2, \ldots, v_K$. Each of these epochs is correlated with the initial pulse estimate using a bank of K correlators 526.1, ..., 526.K to generate estimates for the distinct phase rotations $\{\phi_k\}_{k=1}^K$ for each of these epochs, i.e.

$$\hat{\phi}_k = \text{angle}(\langle v_0, v_k \rangle), k=1, \ldots, K, \quad \text{Eq (7)}$$

where $\langle v_0, v_k \rangle = \int_0^T v_0^*(t) v_k(t) dt$ is the inner product of the sampled epochs $v_0(t)$ and $v_k(t)$.

The estimated phases are used by a unit vector generator 528 to generate phase vectors with unit magnitudes and phases that are based on the estimated distinct phase rotations. In an embodiment, a first bank of K multipliers 532.1, ..., 532.K is used to multiply each of the partitioned epochs by unit vectors with phases that are equal to the negative of the estimated distinct phase rotations. That is, each of the epochs $v_1, v_2, \ldots, v_K$ with its distinct phase rotations is de-rotated using the estimates of $\{\phi_k\}_{k=1}^K$. An averaging unit 534 generates a final estimate of the common pulse shape $\hat{p}(t)$ by averaging the de-rotated epochs, i.e.

$$\hat{p}(t) = \frac{1}{K+1} \sum_{k=0}^K v_k(t) \exp(-j\hat{\phi}_k), \quad \text{Eq (8)}$$

where $\hat{\phi}_0 = 0$, and $\hat{\phi}_k$ is as specified in Equation (7).

In another embodiment, each of the epochs comprises a distinct amplitude (as described in Equation (6)); the amplitude for the $k^{th}$ epoch may be estimated as $$\hat{A}_k = \frac{|\langle v_0, v_k \rangle|}{\|v_0\|^2}, \quad \text{Eq (9)}$$

and the corresponding final estimate of the common pulse shape is computed as $$\hat{p}(t) = \frac{\sum \hat{A}_k v_k(t) \exp(-j\hat{\phi}_k)}{\sum \hat{A}_k^2}. \quad \text{Eq (10)}$$

Note that the weighted average in Equation (10) simplifies to the final estimate of the common pulse shape in Equation (8) when all the amplitudes are equal to each other.

Demultiplexer 536 generates K+1 copies of the final estimate of the common pulse shape, each of which is multiplied by a unit vector with a phase equal to the respective estimated distinct phase rotation using a second bank of K+1 multipliers 538.0, ..., 538.K. The distinctly rotated final pulse estimates are concatenated using a multiplexer 542 to generate an estimate of the swept-tone interferer, given by $$\hat{j}(t) = \sum_{k=0}^K \hat{p}(t-kT) \exp(j\hat{\phi}_k). \quad \text{Eq (11)}$$

In an embodiment, this estimate may be subtracted from the filtered complex-valued composite signal to generate an interference-mitigated signal of interest.

Figure 5B:
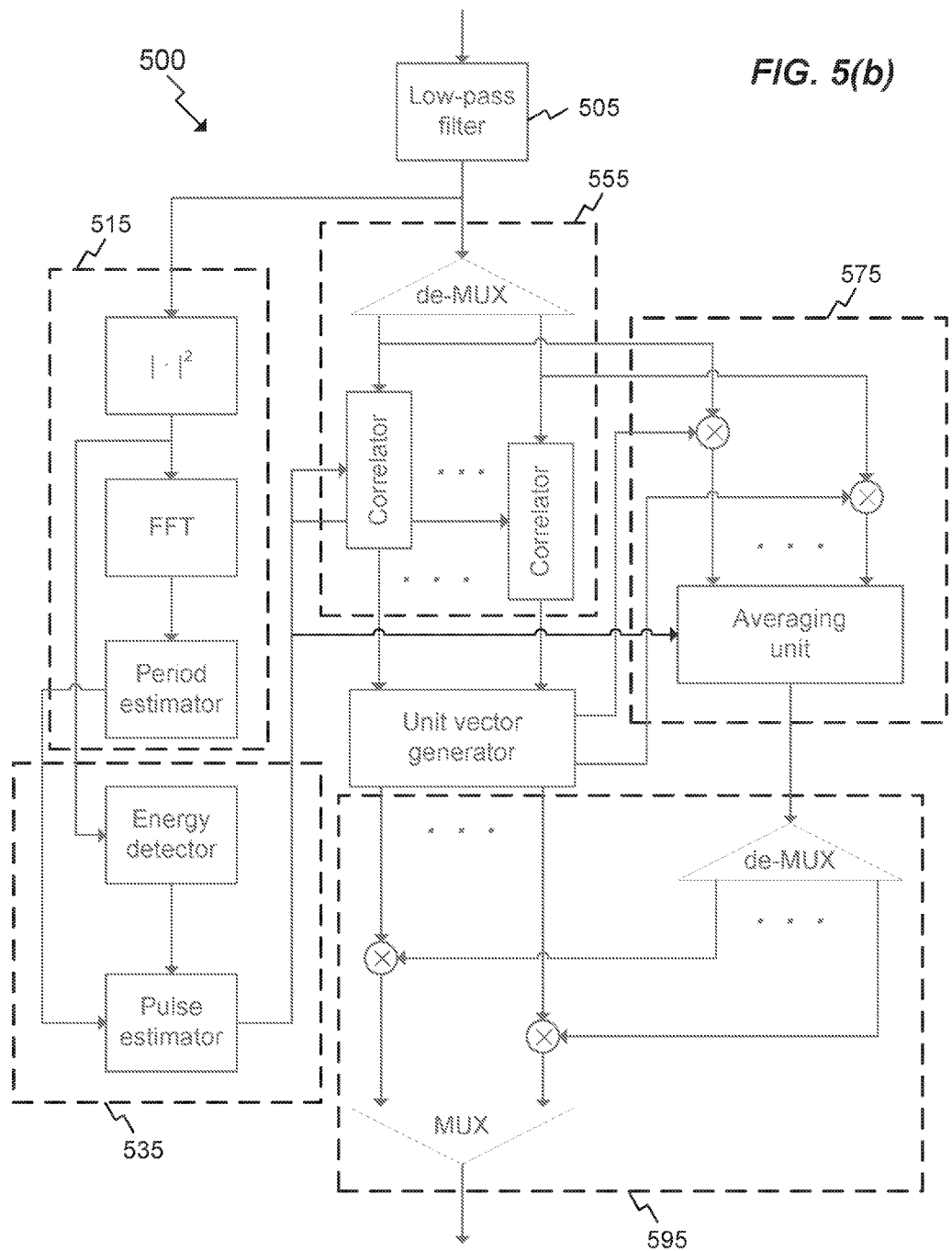

FIG. 5(b) is a block diagram 500 that maps the embodiment for estimation of a swept-tone interferer described in FIG. 5(a) to the generic modules shown in FIG. 4. This system includes some features and/or components that are similar to those shown in FIGS. 2, 3, 4 and 5(a), and described above. At least some of these features and/or components may not be separately described in this section.

As shown in FIG. 5(b), and in reference to FIGS. 4 and 5(a), the period estimation module 515 is realized by using at least one harmonic of a frequency spectrum to determine the period, and the frequency spectrum is generated by computing the FFT of an energy signal that is based on the filtered composite signal. In another embodiment, computing the autocorrelation of the magnitude-periodic signal may be used to determine the period. In particular, the autocorrelation will exhibit peaks at all lags that comprise the alignment of the common pulse shapes. That is, a maximum peak of the autocorrelation will occur at zero-lag and additional peaks will occur at lags that correspond to the period of the magnitude-periodic signal. Thus, both time- and frequency-domain methods may be employed to determine the period in the period estimation module 515.

The initial pulse estimation module 535 is realized using an energy detector and a pulse generator that generates an initial estimate of the common pulse shape by extracting the first epoch of the swept-tone interferer. In particular, the energy detector processes the energy signal to determine the start and end points of the common pulse shape in the first epoch, and the period is then used to extract the first epoch. In another embodiment, the autocorrelation of the magnitude-periodic signal may be used to determine the initial pulse estimate. For example, a segment that begins at a minimum value of the autocorrelation, and extends for the length of a period, may be used as the initial estimate of the common pulse shape.

In yet another embodiment, the initial pulse estimate may be correlated with each of the epochs in an effort to verify that a robust estimate of the common pulse shape has been extracted (as compared to a spurious feature with a comparable amount of energy) prior to the estimation of the distinct phase rotations. In an example, normalized correlation values between 0.85 and 1.0 are expected if a "correct" epoch has been extracted as the initial pulse estimate.

In this embodiment, the phase estimation module 555 is realized using a bank of correlators that correlate each of the epochs with the initial pulse estimate. As described in reference to FIG. 5(a), the final pulse estimation module 575 averages all K+1 de-rotated epochs to generate the final pulse estimate. Finally, the interference estimation module 595 generates an estimate of the interference by concatenating replicas of the final pulse estimate after they have been rotated by the respective estimate of the distinct phase rotation.

Figure 6:
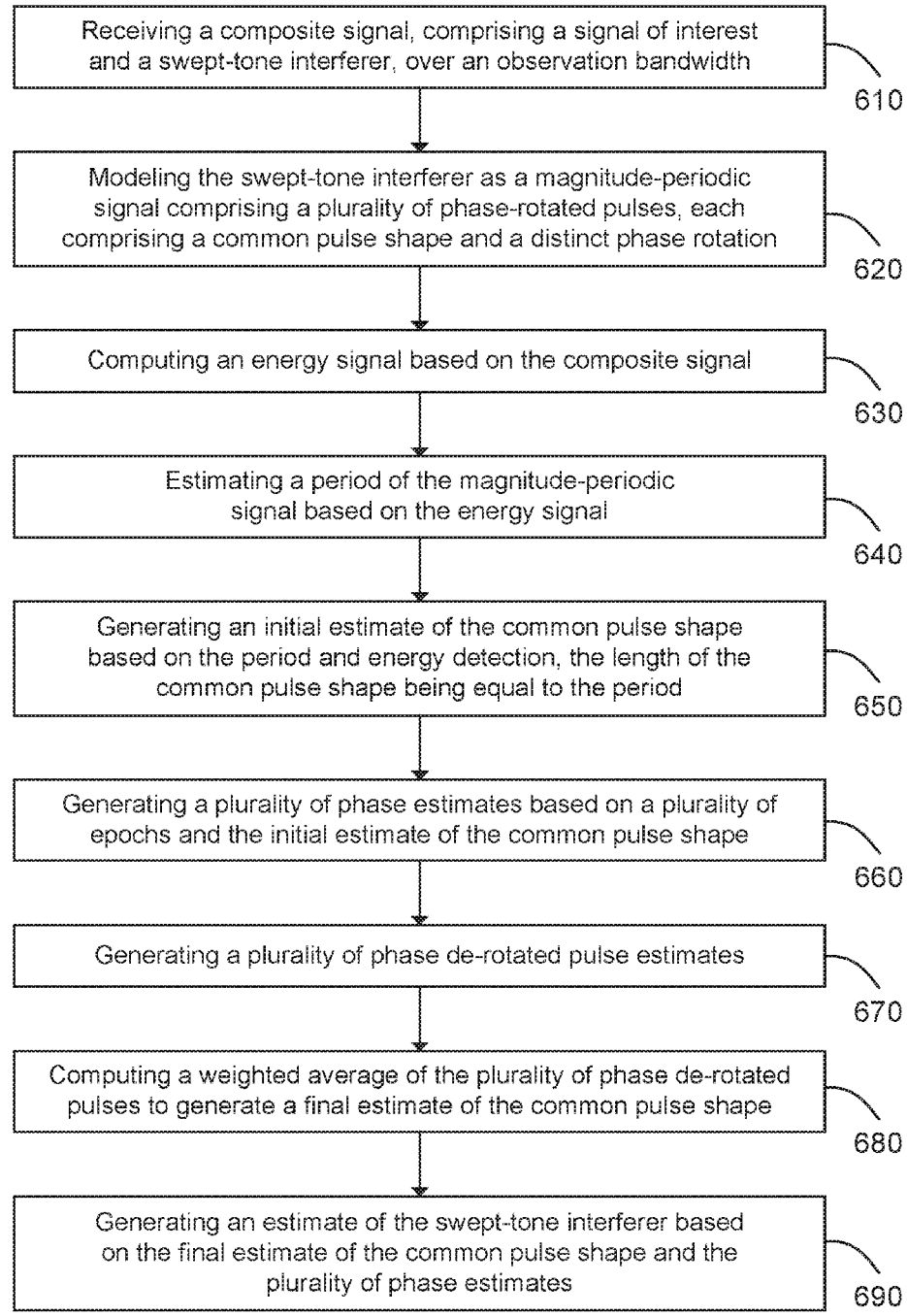
FIG. 6 is a flow chart for a method for estimation and mitigation of a swept-tone interferer, according to an embodiment of the present invention.

FIG. 6 is a flowchart for a method for estimating a swept-tone interferer, according to an embodiment of the present invention. In some embodiments, the order of steps in the flowchart may be changed. Furthermore, some of the steps in the flowchart may be skipped or additional steps may be added.

With reference to FIGS. 4, 5(a) and 5(b), the method 600 begins at step 610 where a composite signal comprising the signal of interest and a swept-tone interferer is received. In an embodiment, the composite signal further comprises additive white Gaussian noise (AWGN). In another embodiment, the composite signal may further comprise other modeled interference. The composite signal is received (and sampled) over an observation bandwidth, and subsequently filtered using a low-pass filter. The low-pass filter may have a bandwidth that is less than or equal to the observation bandwidth, and in other embodiments, multiple low-pass filters may be employed for this purpose.

At step 620, the swept-tone interferer over the observation bandwidth is modeled as a magnitude-periodic signal comprising a set of non-overlapping, contiguous phase-rotated pulses. In an embodiment, each of the phase-rotated pulses comprises a common pulse shape and a distinct phase rotation. In another embodiment, the phase-rotated pulses further comprise distinct amplitudes.

At step 630, an energy signal is computed based on the composite signal using a magnitude-squaring function. The energy signal is a periodic signal, and may be segmented into epochs, each of which comprises at least the common pulse shape.

At step 640, the period of the magnitude-periodic signal is estimated based on at least one harmonic of a frequency spectrum of the energy signal. In an embodiment, the fast Fourier transform (FFT) is used to compute the frequency spectrum, and the period is based on only the strongest (and typically fundamental) harmonic of the frequency spectrum. In another embodiment, multiple harmonics (at frequencies 1/T, 2/T, 3/T, . . . ) are used to estimate the period, via an average or a weighted average.

At step 650, an initial estimate of the common pulse shape is generated based on the period and the energy detection of the energy signal. In an embodiment, an energy detector is used to determine the start and end (in time) of the common pulse shape, and knowledge of the period enables the generation of an initial estimate of the common pulse shape. For example, the first epoch may be used as an initial estimate of the common pulse shape.

At step 660, the set of distinct phase rotations is estimated based on a plurality of epochs and the initial estimate of the common pulse shape. As noted earlier, the epochs are non-overlapping, contiguous segments of the filtered composite signal, wherein each epoch comprises a common pulse shape and a distinct phase rotation (which is being estimated at this step). In an embodiment, the initial estimate of the common pulse shape is correlated with each of the plurality of epochs to generate the distinct phase rotation estimate.

At step 670, a plurality of phase de-rotated pulse estimates are generated by multiplying each of the epochs by a unit vector that has a phase that is equal to the negative of the estimated distinct phase rotation for that epoch. In another embodiment, when the magnitude-periodic signal is modeled with both a distinct phase and amplitude, the $k^{th}$ pulse estimate is given by $\hat{A}_k v_k(t) \exp(-j\hat{\phi}_k)$.

At step 680, a weighted average of the plurality of phase de-rotated pulse estimates is computed to generate a final estimate of the common pulse shape. As is expected, the final estimate of the common pulse shape of the swept-tone interferer will be minimally affected by AWGN and the signal of interest due to the averaging of all the epochs.

At step 690, the final estimate of the common pulse shape is rotated by each of the distinct phase rotations, and the rotated final estimates are concatenated to generate an estimate of the swept-tone interference. In an embodiment, the estimate of the swept-tone interference is subtracted from the filtered composite signal to generate an interference-mitigated signal of interest.

Figure 7:
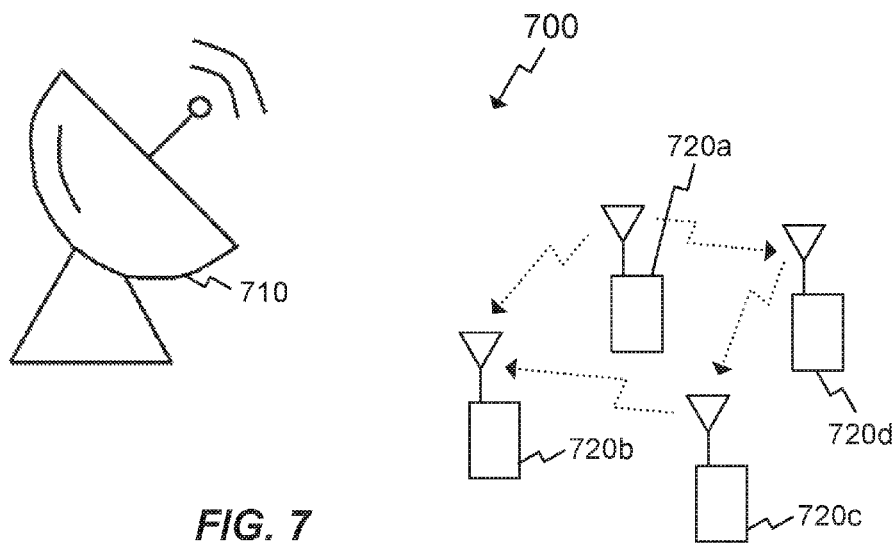
FIG. 7 is a block diagram of a system comprising the means for estimation and mitigation of a swept-tone interferer according to an embodiment of the present invention.

FIG. 7 depicts a system 700 comprising means for estimation and mitigation of a swept-tone interferer according an embodiment of the present invention. This system includes some features and/or components that are similar to those shown in FIGS. 2, 3(a) and 3(b) and described above. At least some of these features and/or components may not be separately described in this section.

In an embodiment, the system 700 comprises member nodes 720a, . . . , 720d of a wireless network and a nearby radar installation 710. The communication of the network nodes may be subject to interference due to the radar sweep signals, whose power is typically significantly higher than the power of the inter-node communications. In the observation bandwidth of the network nodes, the radar sweep signal acts as a swept-tone interferer that can be estimated and mitigation by embodiments of the present invention.

Figure 8:
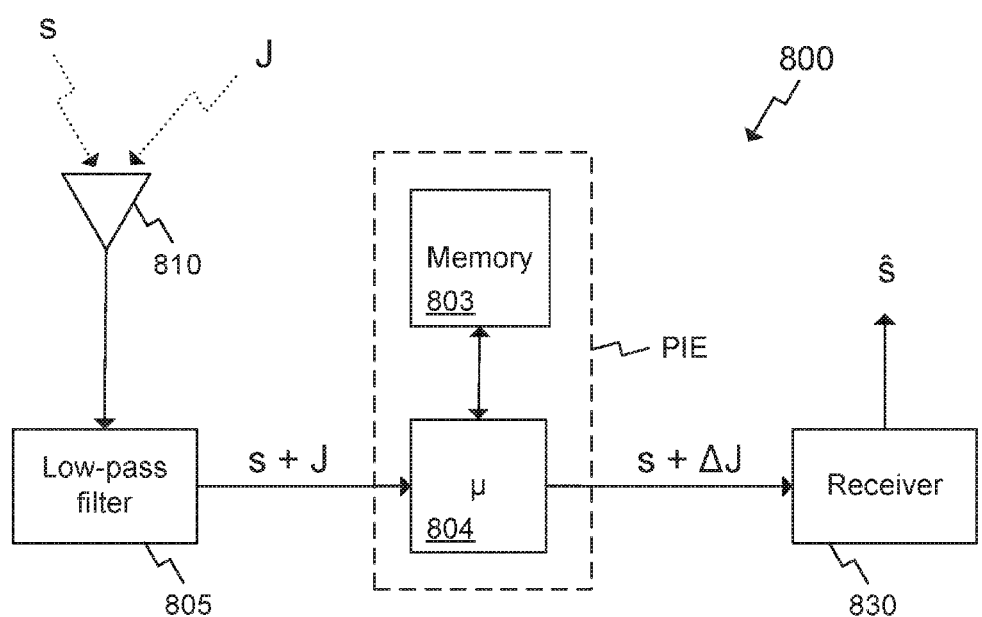
FIG. 8 is a block diagram of another system comprising the means for estimation and mitigation of a swept-tone interferer according to another embodiment of the present invention.

That is, each of the network nodes 720a, . . . , 720d may be configured as the system 800 shown in FIG. 8, wherein an antenna 810 receives both the signal of interest s and the interfering radar sweep signal J. The low-pass filtered composite signal (s+J) is initially processed by the periodic interference estimator (PIE), which estimates and mitigates the swept-tone interferer according to embodiments of the present invention. The interference-mitigated signal (s+ΔJ) is subsequently processed by a receiver 830 to enable network communication. The estimation and mitigation of the radar sweep signal will typically employ the model described in Equation (6), in which the each epoch comprises a common pulse shape, a distinct amplitude and a distinct phase rotation.

In an embodiment, the PIE unit comprises a processor 804 and a memory 803. The processor 804 may comprise component digital processors, and may be configured to execute computer-executable program instructions stored in memory 803. For example, the component digital processors may execute one or more computer programs for enabling the estimation and mitigation of swept-tone interferers in accordance with embodiments of the present invention.

Processor 804 may comprise a variety of implementations for estimating a period of the magnitude-periodic signal, an initial and final pulse estimate of common pulse estimate, a set of distinct phase rotations, and computing a weighted average of pulse estimates to generate an estimate of the swept-tone interferer, as well as a microprocessor, a digital signal processor (DSP), an application-specific integrated circuit (ASIC), one or more field programmable gate arrays (FPGAs), state machines, or the like. Processor 804 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 803 may comprise a non-transitory computer-readable medium that stores instructions which, when executed by the processor 804, cause the processor 804 to perform various steps, such as those described herein. Examples of computer-readable media include, but are not limited to, electronic, optical, magnetic, or other storage or transmission devices capable of providing the processor 804 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 804 and the processing described may be in one or more structures, and may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed is:

1. A method for estimating a swept-tone interferer, the method comprising:
   receiving a composite signal over an observation bandwidth, wherein the composite signal comprises a signal of interest and the swept-tone interferer;
   modeling the swept-tone interferer over the observation bandwidth as a magnitude-periodic signal, wherein the magnitude-periodic signal comprises a plurality of phase-rotated pulses, and wherein each of the plurality of phase-rotated pulses comprises a common pulse shape and a distinct phase rotation;
   generating an energy signal based on the composite signal;
   estimating a period of the magnitude-periodic signal based on the energy signal;
   generating an initial estimate of the common pulse shape based on the period and energy detection of the energy signal, wherein a length of the initial estimate of the common pulse shape is equal to the period;
   generating a plurality of phase estimates based on a plurality of epochs and the initial estimate of the common pulse shape, wherein the plurality of epochs corresponds to non-overlapping, contiguous segments of the composite signal, wherein a length of each of the plurality of epochs is equal to the period, wherein each of the plurality of epochs comprises the common pulse shape, and wherein each of the plurality of phase estimates is generated for each of the plurality of epochs;
   generating a plurality of phase de-rotated pulse estimates, wherein each of the plurality of phase de-rotated pulse estimates is based on each of the plurality of epochs and each of the plurality of phase estimates;
   computing a weighted average of the plurality of phase de-rotated pulse estimates to generate a final estimate of the common pulse shape; and
   generating an estimate of the swept-tone interferer based on the final estimate of the common pulse shape and the plurality of phase estimates.

2. The method of claim 1, wherein the swept-tone interferer sweeps from a start frequency, $f_{start}$, to a stop frequency, $f_{stop}$, and wherein a repetition frequency of the swept-tone interferer is an inverse of the period of the magnitude-periodic signal.

3. The method of claim 2, wherein $|f_{stop}-f_{start}|$ is greater than the observation bandwidth, and wherein a power of the swept-tone interferer is greater than a power of the signal of interest.

4. The method of claim 1, wherein generating the plurality of phase estimates comprises correlating the initial estimate of the common pulse shape with each of the plurality of epochs.

5. The method of claim 1, wherein each of the plurality of phase de-rotated pulse estimates is a product of each of the plurality of epochs and a unit vector with a phase that is equal to a negative of each of the plurality of phase estimates.

6. The method of claim 1, wherein estimating the period of the magnitude-periodic signal further comprises:
   generating a frequency spectrum of the energy signal; and
   estimating the period based on at least one harmonic of the frequency spectrum.

7. The method of claim 6, wherein the frequency spectrum of the energy signal is based on a Fast Fourier Transform (FFT), and wherein the FFT is computed over a portion of the energy signal that comprises at least one of the plurality of epochs.

8. The method of claim 1, wherein a weighting for each of the plurality of phase de-rotated pulse estimates in the weighted average is unity.

9. The method of claim 1, wherein each of the plurality of phase-rotated pulses further comprises a distinct amplitude, and wherein a weighting for each of the plurality of phase de-rotated pulse estimates in the weighted average is based on an estimate of the distinct amplitude.

10. The method of claim 1, wherein generating the estimate of the swept-tone interferer further comprises:
    multiplying the final estimate of the common pulse shape and a unit vector with a phase that is equal to each of the plurality of phase estimates to generate a plurality of phase-rotated final estimates of the common pulse shape; and
    concatenating the plurality of phase-rotated final estimates of the common pulse shape.

11. The method of claim 1, wherein generating the initial estimate of the common pulse shape further comprises:
    correlating the initial estimate of the common pulse shape with the plurality of epochs to generate a plurality of normalized correlation values, wherein each of the plurality of normalized correlation values is in the range 0.85 to 1.0.

12. An apparatus for mitigating an effect of a swept-tone interferer from a composite signal comprising a signal of interest and the swept-tone interferer, the apparatus comprising:
    a receiver configured to receive the composite signal over an observation bandwidth, wherein the swept-tone interferer is modeled as a magnitude-periodic signal, wherein the magnitude-periodic signal comprises a plurality of phase-rotated pulses, and wherein each of the plurality of phase-rotated pulses comprises a common pulse shape and a distinct phase rotation;
    a squaring module configured to compute an energy signal based on the composite signal;
    a period estimation module configured to estimate a period of the magnitude-periodic signal based on the energy signal;

a first pulse estimation module configured to generate an initial estimate of the common pulse shape based on the period and energy detection of the energy signal, wherein a length of the initial estimate of the common pulse shape is equal to the period;

a phase estimation module configured to estimate a plurality of phase estimates based on a plurality of epochs and the initial estimate of the common pulse shape, wherein the plurality of epochs corresponds to non-overlapping, contiguous segments of the composite signal, wherein a length of each of the plurality of epochs is equal to the period, wherein each of the plurality of epochs comprises the common pulse shape, and wherein each of the plurality of phase estimates is generated for each of the plurality of epochs;

a second pulse estimation module configured to generate a plurality of phase de-rotated pulse estimates, wherein each of the plurality of phase de-rotated pulse estimates is based on each of the plurality of epochs and each of the plurality of phase estimates;

an averaging module configured to compute a weighted average the plurality of phase de-rotated pulse estimates to generate a final estimate of the common pulse shape;

an interference estimation module configured to generate an estimate of the swept-tone interferer based on the final estimate of the common pulse shape and the plurality of phase estimates; and a summer configured to subtract the estimate of the swept-tone interferer from the composite signal to generate an interference-mitigated signal of interest.

13. The apparatus of claim 12, wherein the swept-tone interferer sweeps from a start frequency, $f_{start}$, to a stop frequency, $f_{stop}$, and wherein a repetition frequency of the swept-tone interferer is an inverse of the period of the magnitude-periodic signal.

14. The apparatus of claim 13, wherein $|f_{stop}/f_{start}|$ is greater than the observation bandwidth.

15. The apparatus of claim 12, wherein a power of the swept-tone interferer is greater than a power of the signal of interest.

16. The apparatus of claim 12, wherein each of the plurality of phase de-rotated pulse estimates is a product of each of the plurality of epochs and a unit vector with a phase that is equal to a negative of each of the plurality of phase estimates.

17. The apparatus of claim 12, wherein a weighting for each of the plurality of phase de-rotated pulse estimates in the weighted average is unity.

18. The apparatus of claim 12, wherein each of the plurality of phase-rotated pulses further comprises a distinct amplitude, and wherein a weighting for each of the plurality of phase de-rotated pulse estimates in the weighted average is based on an estimate of the distinct amplitude.

19. The apparatus of claim 12, wherein the interference estimation module is further configured to:

multiply the final estimate of the common pulse shape and a unit vector with a phase that is equal to each of the plurality of phase estimates to generate a plurality of phase-rotated final estimates of the common pulse shape; and concatenate the plurality of phase-rotated final estimates of the common pulse shape to generate the estimate of the swept-tone interferer.

20. A non-transitory tangible computer-readable medium embodying program code executable by a computing system, the program code comprising:

program code for receiving a composite signal over an observation bandwidth, wherein the composite signal comprises a signal of interest and a swept-tone interferer;

program code for modeling the swept-tone interferer over the observation bandwidth as a magnitude-periodic signal, wherein the magnitude-periodic signal comprises a plurality of phase-rotated pulses, and wherein each of the plurality of phase-rotated pulses comprises a common pulse shape and a distinct phase rotation;

program code for computing an energy signal based on the composite signal;

program code for estimating a period of the magnitude-periodic signal based on the energy signal;

program code for generating an initial estimate of the common pulse shape based on the period and energy detection of the energy signal, wherein a length of the initial estimate of the common pulse shape is equal to the period;

program code for estimating a plurality of phase estimates based on a plurality of epochs and the initial estimate of the common pulse shape, wherein the plurality of epochs corresponds to non-overlapping, contiguous segments of the composite signal, wherein a length of each of the plurality of epochs is equal to the period, wherein each of the plurality of epochs comprises the common pulse shape, and wherein each of the plurality of phase estimates is generated for each of the plurality of epochs;

program code for generating a plurality of phase de-rotated pulse estimates, wherein each of the plurality of phase de-rotated pulse estimates is based on each of the plurality of epochs and each of the plurality of phase estimates;

program code for computing a weighted average of the plurality of phase de-rotated pulse estimates to generate a final estimate of the common pulse shape; and program code for generating an estimate of the swept-tone interferer based on the final estimate of the common pulse shape and the plurality of phase estimates.

* * * * *